US012769124B2

(12) United States Patent
Kasar et al.

(10) Patent No.: US 12,769,124 B2
(45) Date of Patent: Oct. 20, 2026

(54) ELECTRONIC DEVICES WITH LIGHT-BLOCKING COVERS

(71) Applicant: Apple Inc., Cupertino, CA (US)

(72) Inventors: Darshan R Kasar, Redwood City, CA (US); Nicholas R Trincia, San Francisco, CA (US); Timon A Wright, San Francisco, CA (US); Vedant A Dhandhania, San Jose, CA (US)

(73) Assignee: Apple Inc., Cupertino, CA (US)

( * ) Notice: Subject to any disclaimer, the term of this patent is extended or adjusted under 35 U.S.C. 154(b) by 730 days.

(21) Appl. No.: 18/339,687

(22) Filed: Jun. 22, 2023

(65) Prior Publication Data

US 2024/0036324 A1 Feb. 1, 2024

Related U.S. Application Data

(60) Provisional application No. 63/393,134, filed on Jul. 28, 2022.

(51) Int. Cl.
*G02B 27/00* (2006.01)
*G02B 27/01* (2006.01)

(52) U.S. Cl.
CPC ..... *G02B 27/0172* (2013.01); *G02B 27/0176* (2013.01); *G02B 2027/0154* (2013.01)

(58) Field of Classification Search
CPC .... H01S 5/3401; H01S 5/1014; H01S 5/1053; H01S 5/14; H01S 5/141; H01S 5/22; H01S 5/4081; H01S 5/423; H01S 5/02407; H01S 5/18; H01S 2301/18; H01S 2302/02; H01S 5/11; H01S 5/18366; G02B 27/01; G02B 27/0101; G02B 27/0103; G02B 27/0149; G02B 27/017; G02B 27/0172; G02B 27/0176; G02B 27/0179; G02B 27/0189; G02B 2027/0105; G02B 2027/0107; G02B 2027/0109; G02B 2027/011; G02B 2027/0112; G02B 2027/0114;
(Continued)

(56) References Cited

U.S. PATENT DOCUMENTS 6,480,174 B1 * 11/2002 Kaufmann ......... G02B 27/0172 359/13
10,133,305 B1 11/2018 Sullivan et al.
(Continued)

*Primary Examiner* — Henry Duong
(74) *Attorney, Agent, or Firm* — Treyz Law Group, P.C.; Kendall P. Woodruff

(57) ABSTRACT

A head-mounted device may include a main housing portion and a temple housing portion. Displays in the main housing portion may be configured to present images that are viewable from eye boxes. A light-blocking cover may extend between the main housing portion and the temple housing portion and may be configured to prevent outside light from reaching the eye boxes. The light-blocking cover may have a stretchable outer fabric layer and an inner light-blocking layer formed from fabric or other suitable materials. The light-blocking cover may include slack in the inner light-blocking layer so that the inner light-blocking layer can accommodate movement of the main housing portion relative to the temple housing portion without sacrificing opacity. The slack may be heat-set, molded, or covered with a layer of elastic so that the slack returns to a retracted state within the temple housing portion after being expanded.

20 Claims, 7 Drawing Sheets

(58) Field of Classification Search

CPC .... G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/0138; G02B 2027/0141; G02B 2027/014; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0178; G02B 2027/0181; G02B 2027/0183; G02B 2027/0185; G02B 2027/0187; G02B 2027/019; G02B 2027/0192; G02B 2027/0194; G02B 2027/0196; G02B 2027/0198

USPC .......................................................... 359/630

See application file for complete search history.

(56) References Cited

U.S. PATENT DOCUMENTS

| | | | |
|---|---|---|---|
| 10,209,738 | B1 | 2/2019 | Tompkins et al. |
| 10,412,845 | B2 | 9/2019 | Chang et al. |
| 11,067,813 | B2 | 7/2021 | Chang et al. |
| 2017/0090514 | A1 | 3/2017 | Byun et al. |
| 2021/0373333 | A1 * | 12/2021 | Moon ...................... G02C 7/08 |
| 2022/0043273 | A1 | 2/2022 | Ellis et al. |

* cited by examiner

ELECTRONIC DEVICES WITH LIGHT-BLOCKING COVERS

This application claims the benefit of provisional patent application No. 63/393,134, filed Jul. 28, 2022, which is hereby incorporated by reference herein in its entirety.

FIELD

This relates generally to electronic devices, and, more particularly, to wearable electronic devices such as head-mounted devices.

BACKGROUND

Electronic devices such as head-mounted devices are configured to be worn on a head of a user. A head-mounted device may have left and right optical systems for presenting images to a user's left and right eyes. The optical systems may be mounted in a head-mounted housing. Conventional head-mounted devices can be uncomfortable to wear and may not sufficiently block outside light from leaking into the device.

SUMMARY

Electronic devices such as head-mounted electronic devices may include a main housing portion and a temple housing portion. Displays and lenses may be mounted in the main housing portion. The displays may be configured to present images that are viewable from eye boxes.

A light-blocking cover may extend at least partially around a periphery of the main housing portion and between the main housing portion and the temple housing portion. The light-blocking cover may be configured to prevent outside light from leaking into the viewing area where the eye boxes are located.

The light-blocking cover may have outer and inner layers. The outer layer may be a stretchable fabric layer and the inner layer may be a light-blocking layer formed from fabric or other suitable materials.

To retain opacity while allowing the light-blocking cover to expand and retract as the main housing portion moves relative to the temple housing portion, the light-blocking cover may include slack in both the expanded and retracted states. The slack may be formed in the inner light-blocking layer so that the inner light-blocking layer can accommodate movement of the main housing portion relative to the temple housing portion without reducing the opacity of the inner light-blocking layer. The slack may retract into the temple housing portion after being expanded, or may retract into other locations. The slack may be heat-set, molded, or covered with a layer of elastic so that the slack returns to the original retracted state after being expanded.

In some arrangements, the light-blocking cover may include a stretchable portion and a light-blocking portion. The stretchable portion may include inner and outer stretchable fabric layers and a light-blocking fabric layer that is interposed between the inner and outer stretchable fabric layers. The light-blocking fabric layer may be selectively anchored to the inner and outer stretchable fabric layers so that opacity is maintained even as the light-blocking cover is stretched. In some arrangements, the stretchable portion and the light-blocking portion of the light-blocking cover may be formed in a single layer. The stretchable portion may be overlapped by an internal housing structure so that any outside light passing through the stretchable portion will be blocked from reaching the eye box.

DETAILED DESCRIPTION

An electronic device such as a head-mounted device may have a front face that faces away from a user's head and may have an opposing rear face that faces the user's head. Optical modules on the rear face may be used to provide images to a user's eyes. A light-blocking cover may be formed around the periphery of the head-mounted housing to help block outside light from leaking into the viewing area of the head-mounted device. The light-blocking cover may be formed from one or more layers of fabric, elastomer, or other suitable materials. The light-blocking cover may be stretchable to accommodate movement of a main housing portion relative to a temple housing portion. To allow for sufficient stretch while preventing outside light from entering the device, the light-blocking cover may include slack that allows the light-blocking cover to expand and retract without compromising opacity. The slack may be heat-set or may be coupled to an elastic layer that helps return the slack to its retracted state after being stretched. In some arrangements, the light-blocking cover may have one or more discrete stretchable regions. Stretchable regions that do not have sufficient opacity may be overlapped by an internal housing structure or other light-blocking structure. In some arrangements, the light-blocking cover may include a light-blocking fabric layer selectively anchored between two stretchable fabric layers.

Figure 1:
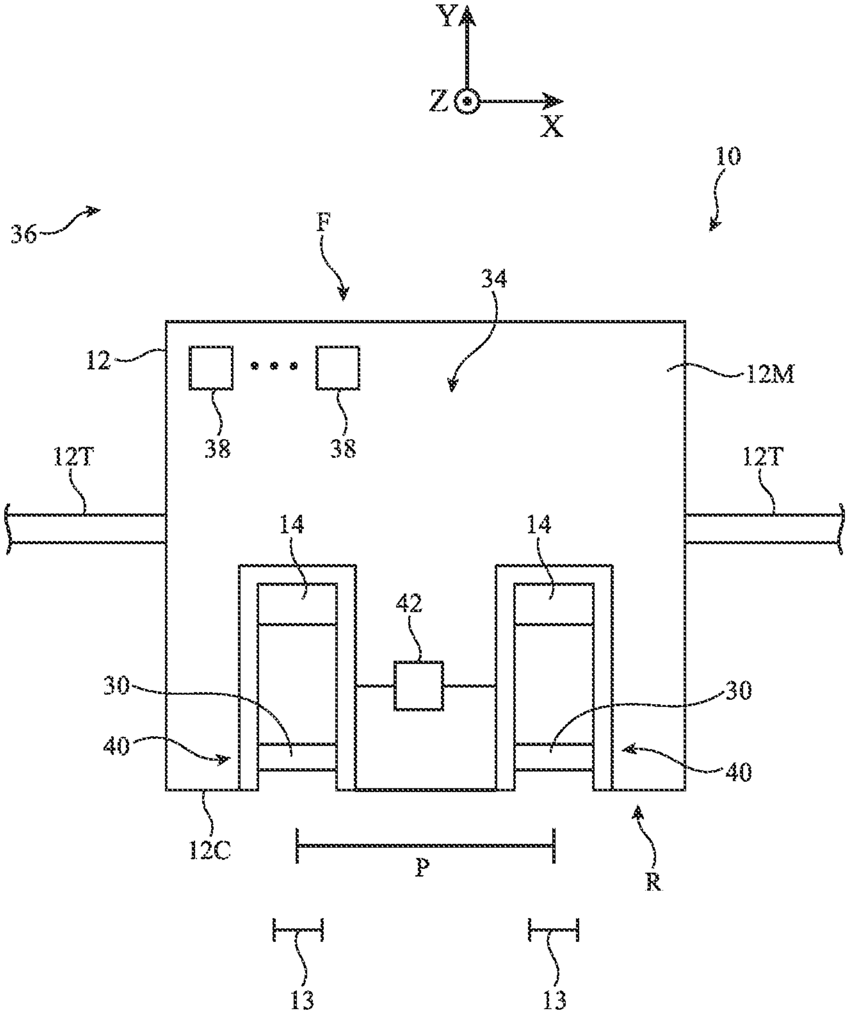
FIG. 1 is a top view of an illustrative head-mounted device in accordance with an embodiment.

A top view of an illustrative head-mounted device that may include a light-blocking cover is shown in FIG. 1. As shown in FIG. 1, head-mounted devices such as electronic device 10 may have head-mounted support structures such as housing 12. Housing 12 may include portions (e.g., support structures 12T) to allow device 10 to be worn on a user's head. Support structures 12T (sometimes referred to as temple housing structures or temple housing portions) may be formed from fabric, polymer, metal, and/or other material. Support structures 12T may form a strap or other head-mounted support structures that help support device 10 on a user's head. Some or all of temple housing portions 12T may overlap a user's temples when device 10 is worn on the user's head. A main support structure (e.g., main housing portion 12M) of housing 12 may support electronic components such as displays 14. Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, fabric, leather, or other soft materials, etc. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, a hat, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as curtain 12C. In an illustrative configuration, curtain 12C includes a fabric layer that separates interior region 34 from the exterior region to the rear of device 10. Other structures may be used in forming curtain 12C, if desired. The presence of curtain 12C on rear face R may help hide internal housing structures, internal components 38, and other structures in interior region 34 from view by a user.

Device 10 may have left and right optical modules 40. Each optical module may include a respective display 14, lens 30, and support structure 32. Support structures 32, which may sometimes be referred to as lens barrels or optical module support structures, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30. Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images. Lenses 30 may include one or more lens elements for providing image light from displays 14 to respective eyes boxes 13. Lenses may be implemented using refractive glass lens elements, using mirror lens structures (catadioptric lenses), using holographic lenses, and/or other lens systems. When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

Not all users have the same interpupillary distance P. To provide device 10 with the ability to adjust the interpupillary spacing between modules 40 along lateral dimension X and thereby adjust the spacing P between eye boxes 13 to accommodate different user interpupillary distances, device 10 may be provided with one or more actuators 42. Actuators 42 can be manually controlled and/or computer-controlled actuators (e.g., computer-controlled motors) for moving support structures 32 relative to each other.

Figure 2:
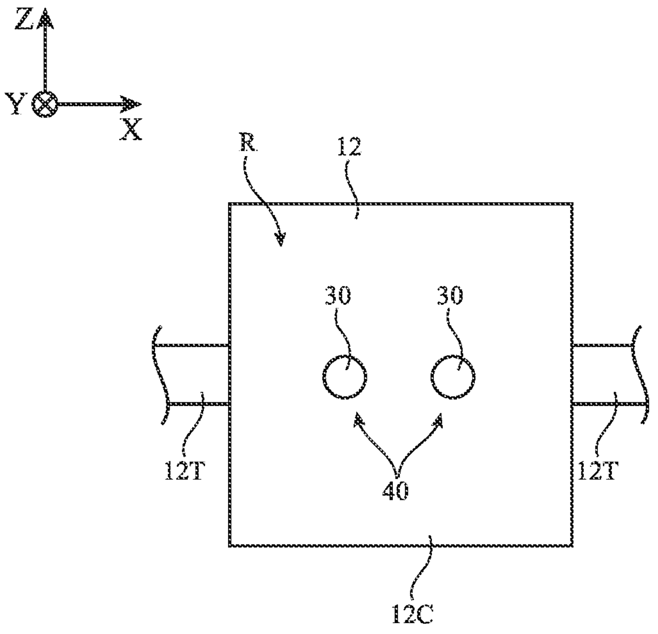
FIG. 2 is a rear view of an illustrative head-mounted device in accordance with an embodiment.

As shown in FIG. 2, curtain 12C may cover rear face F while leaving lenses 30 of optical modules 40 uncovered (e.g., curtain 12C may have openings that are aligned with and receive modules 40). As modules 40 are moved relative to each other along dimension X to accommodate different interpupillary distances for different users, modules 40 move relative to fixed housing structures such as the walls of main portion 12M and move relative to each other. To prevent undesired wrinkling and buckling of curtain 12C as optical modules 40 are moved relative to rigid portions of housing 12M and relative to each other, a fabric layer or other cover layer in curtain 12C may be configured to slide, stretch, open/close, and/or otherwise adjust to accommodate optical module movement.

Figure 3:
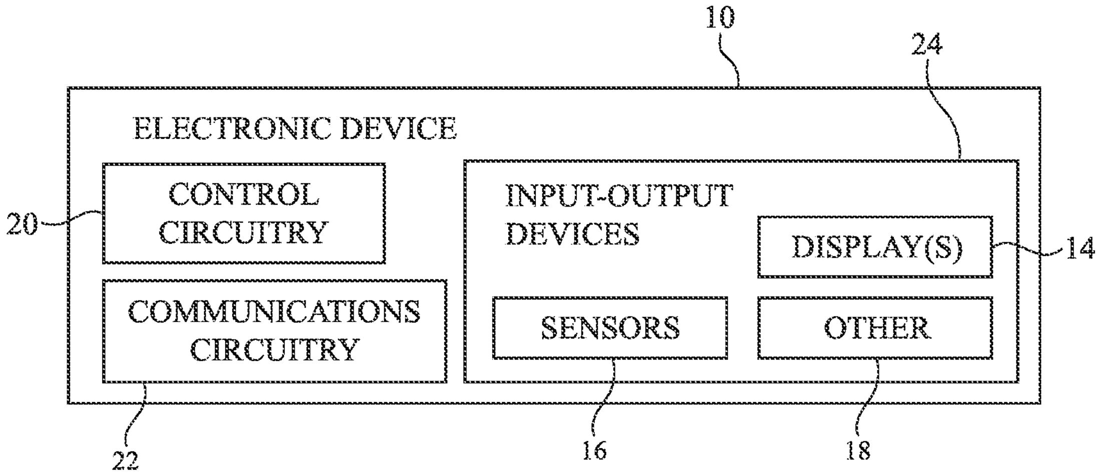
FIG. 3 is a schematic diagram of an illustrative head-mounted device in accordance with an embodiment.

A schematic diagram of an illustrative electronic device such as a head-mounted device or other wearable device is shown in FIG. 3. Device 10 of FIG. 3 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 3.

As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 4:
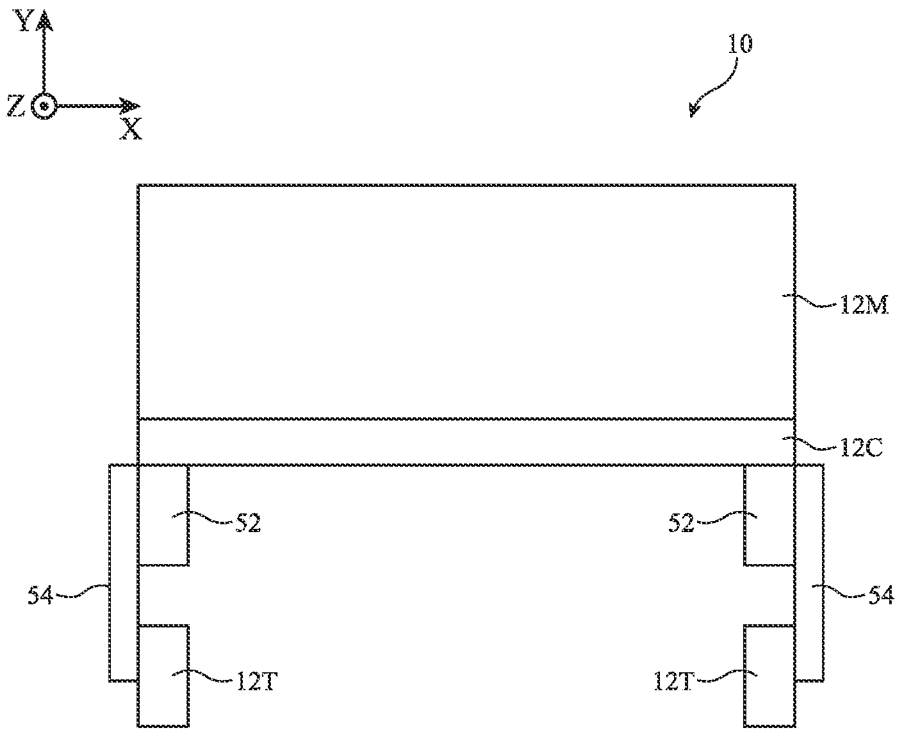
FIG. 4 is a top view of an illustrative head-mounted device in which a light-blocking cover is formed over housing structures in accordance with an embodiment.

FIG. 4 is a top view of device 10 showing how a light-blocking cover may be used to help prevent outside light from leaking into the viewing area of head-mounted device 10. As shown in FIG. 4, device 10 may include main housing portion 12M which is configured to be mounted on a user's head using temple housing portions 12T. If desired, one or more electronic components may be mounted in temple housing portions 12T such as wireless charging circuitry, input-output devices (buttons, touch sensors, rotating knobs, etc.), sensors, etc. In other arrangements, temple housing portions 12T may be free of electronic components. Temple housing portions 12T may be formed using rigid support structures and/or flexible materials. If desired, device 10 may have a ring-shaped opaque light seal such as light seal 52. Light seal 52 may be configured to be removable (e.g., so that light seal 52 may be replaced when worn). Foam or other soft materials may be used in forming light seal 52.

To help block outside light (e.g., ambient light in the user's environment that is not emitted by displays 14 of device 10) from entering the viewing area of head-mounted device 10 (e.g., where eye boxes 13 of FIG. 1 are located), a light-blocking cover such as light-blocking cover 54 may be formed over some or all of the housing structures of device 10. For example, as shown in FIG. 4, light-blocking cover 54 may extend between main housing portion 12M and temple housing portions 12T to help prevent light from entering any gaps between device 10 and the user's face. Light-blocking cover 54 may be formed from one or more layers of fabric, polymer, elastomer, or other suitable materials. In one illustrative arrangement, light-blocking cover includes a stretchable fabric outer layer and a light-blocking fabric inner layer or a light-blocking inner layer formed from other materials. Light-blocking cover 54 may be configured to stretch and/or otherwise expand and retract to allow some movement of main housing portion 12M relative to temple housing portions 12T. This allows device 10 to accommodate different face shapes.

Figure 5:
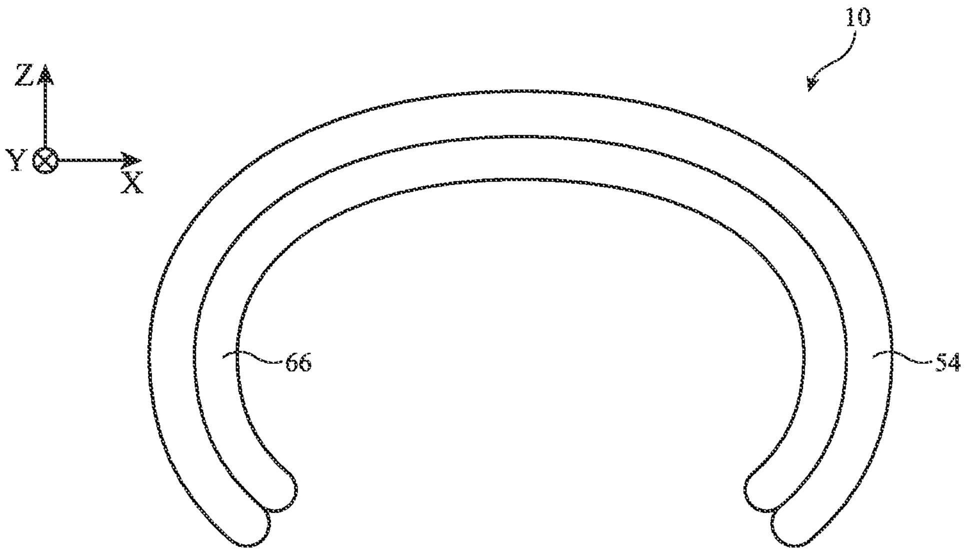
FIG. 5 is a rear view of an illustrative head-mounted device having a face frame and a light-blocking cover in accordance with an embodiment.

FIG. 5 is a rear view of device 10 showing how light-blocking cover 54 may wrap around the periphery of device 10. As shown in FIG. 5, device 10 may include a face frame such as face frame 66. Face frame 66 may be a flexible support structure formed from plastic or other suitable materials and may be configured to rest against the user's face (or adjacent to the user's face). Face frame 66 may curve around the optical modules of device 10 (e.g., around and over the top of optical modules 40 of FIG. 2) and may extend across the user's forehead and at least partially onto the temples. Light-blocking cover 54 may extend around some or all of face frame 66 and may also extend across the user's forehead (e.g., above optical modules 40) and at least partially onto the temples (e.g., to the left and right of optical modules 40). This helps block light from leaking between the user's forehead and device 10 as well as between the user's temples and device 10.

Figure 6:
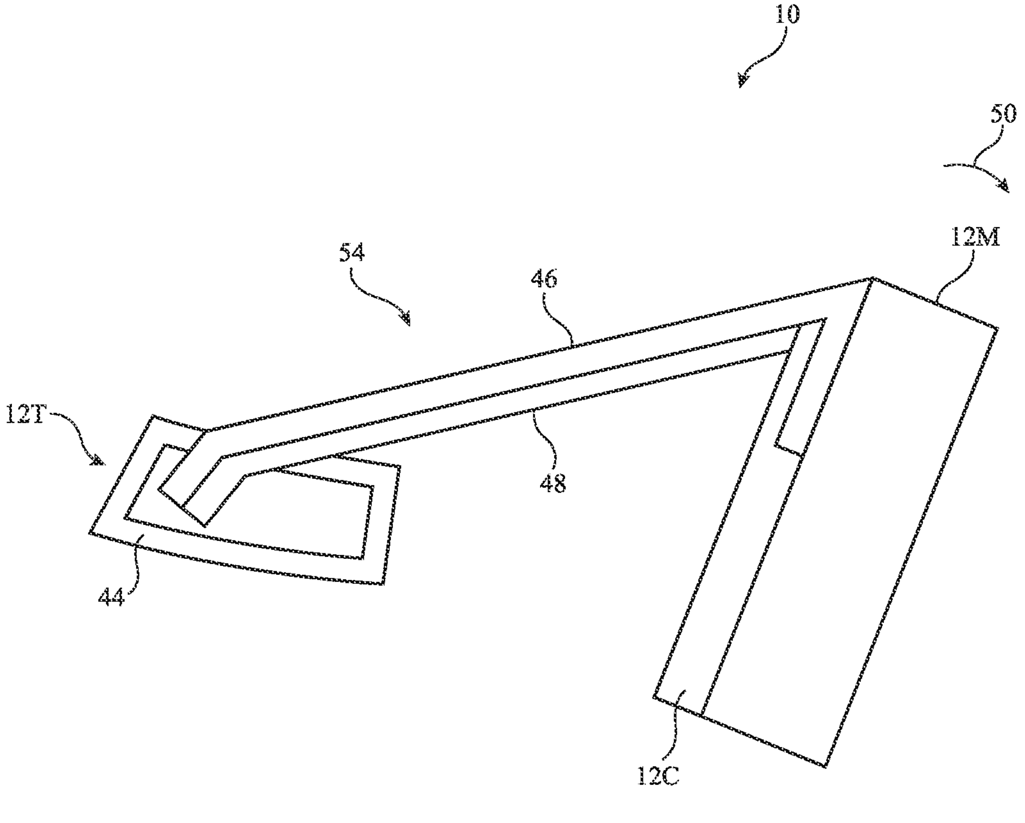
FIG. 6 is a side view of an illustrative head-mounted device having a light-blocking cover that spans across a temple region in accordance with an embodiment.

FIG. 6 is a side view of an illustrative head-mounted device having a light-blocking cover. As shown in FIG. 6, light-blocking cover 54 may extend between main housing portion 12M and temple housing portion 12T. Temple housing portion 12T may include a support structure such as support structure 44. Support structure 44 may be configured to rest above a user's ear, behind a user's ear, and/or in other suitable locations on the user's head. A first edge of light-blocking cover 54 may be attached to support structure 44 of temple housing portion 12T (e.g., using adhesive, clips, stitching, and/or any other suitable attachment structure). A second opposing edge of light-blocking cover 54 may be attached to main housing portion 12M (e.g., behind curtain 12C, as shown in the example of FIG. 6, in front of curtain 12C, or in any other suitable location on main housing portion 12M).

Light-blocking cover 54 may include one or more layers such as outer layer 46 and inner layer 48. Outer layer 46 may form an outermost surface of device 10, if desired. Outer layer 46 may be formed from fabric such as knit fabric (e.g., warp knit fabric, weft knit fabric, etc.), woven fabric, spacer fabric (e.g., inner and outer warp knit layers joined by a spacer layer such as a monofilament strand), braided fabric, and/or any other suitable fabric. Arrangements in which outer layer 46 is formed from non-fabric materials such as polymer, silicone, or elastomer may also be used. Arrangements in which outer layer 46 of light-blocking cover 54 is formed from a stretchable fabric are sometimes described herein as an example.

Inner layer 48 may be a light-blocking layer that lines the interior surface of outer layer 46 of light-blocking cover 54. Inner layer 48 may be formed from fabric (e.g., knit fabric, warp knit fabric, weft knit fabric, woven fabric, spacer fabric, braided fabric, and/or any other suitable fabric), polymer, elastomer (e.g., elastomeric silicone, other elastomers, etc.). Fabric may provide device 10 with breathability but may allow light leakage if care is not taken. In particular, when device 10 is placed on the user's head, main housing unit 12M may rotate forward in direction 50 or may otherwise be pushed away from support structure 44 of temple housing portions 12T. If care is not taken, inner light-blocking layer 48 may stretch too much, causing the openings in the fabric to expand (e.g., causing the weave to open up) and allow light in. Inner light-blocking layer 48 may be formed from solid materials such as a solid layer of polymer or elastomer instead of fabric, but care should be taken to ensure that inner layer 48 has sufficient ability to expand and retract to accommodate movement of main housing portion 12M and support structure 44 of temple housing portions 12T as device 10 is mounted on and removed from a user's head.

To ensure sufficient stretch without compromising opacity, inner layer 48 may be provided with extra slack to ensure that a minimum slack is maintained at all times in layer 48, even as light-blocking cover 54 moves between retracted and expanded states. This type of arrangement is illustrated in FIGS. 7 and 8.

Figure 7:
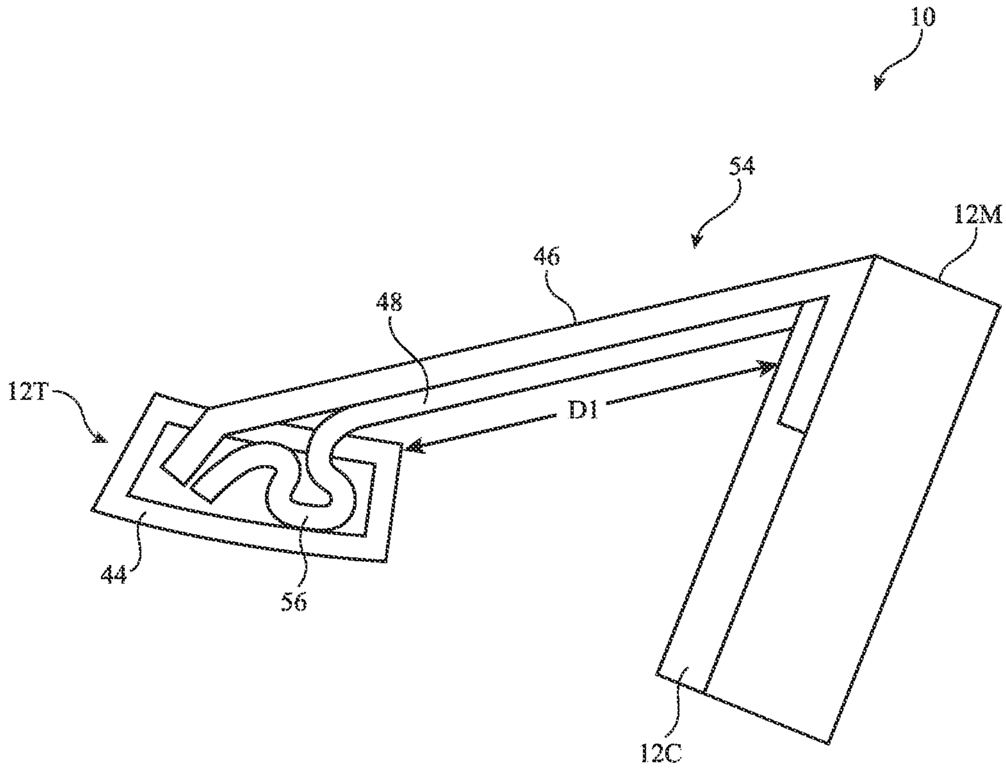
FIG. 7 is a side view of an illustrative head-mounted device having a light-blocking cover with slack in a retracted state in accordance with an embodiment.

FIG. 7 is a side view of head-mounted device 10 in which light-blocking cover 54 is in a retracted state (e.g., when device 10 is not mounted on a user's head). As shown in FIG. 7, inner fabric layer 48 may be provided with extra slack such as extra slack 56 (sometimes referred to as a service loop). Slack 56 may be provided only in temple regions of device 10 (e.g., near support structure 44 of temple housing portions 12T) or may extend partially or fully around the perimeter of light-blocking cover 54 (e.g., around the periphery of a user's face such as across the forehead and onto the temples). When light-blocking cover 54 is in the retracted state of FIG. 7, slack 56 may be gathered within the interior of support structure 44 (sometimes referred to as a slack reservoir) of temple housing portions 12T. In the retracted state, light-blocking cover 54 may span across distance D1 between main housing portion 12M and support structure 44 of temple housing portion 12T. If desired, slack 56 may be gathered in other locations (e.g., outside of support structure 44) in the retracted state, such as a slack reservoir formed closer to main housing portion 12M or in other locations along light-blocking cover 54.

Figure 8:
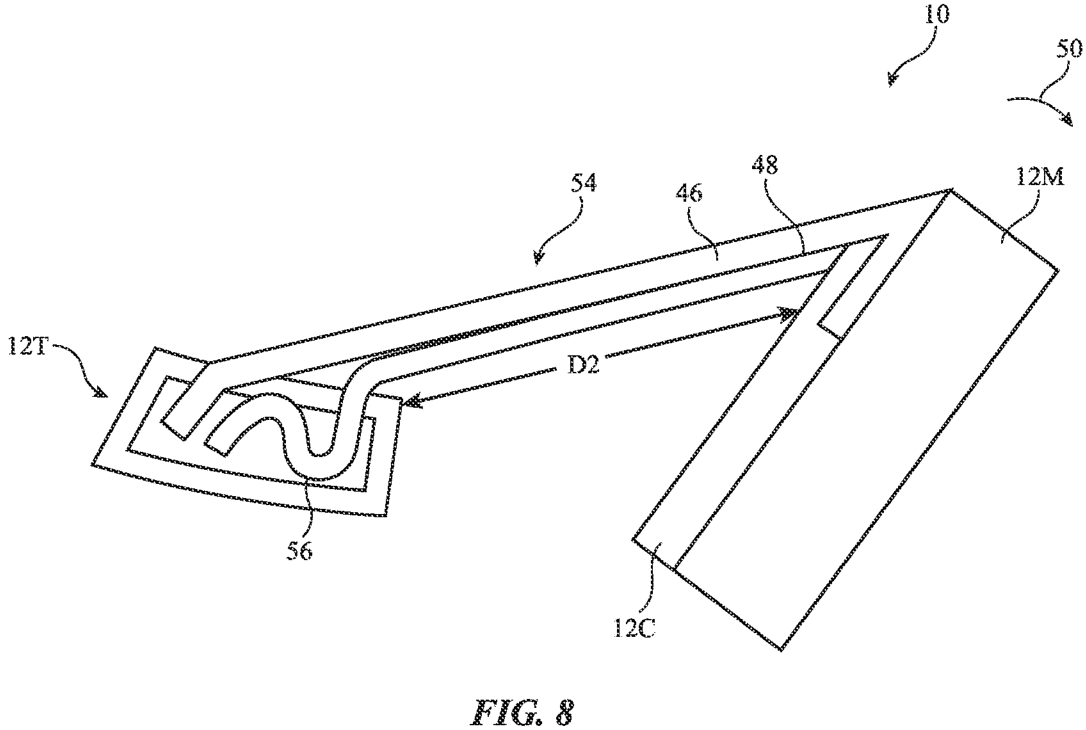
FIG. 8 is a side view of an illustrative head-mounted device having a light-blocking cover with slack in an expanded state in accordance with an embodiment.

When device 10 is mounted to a user's head, main housing portion 12M may tend to move away from support structure 44 of temple housing portion 12T, as shown in FIG. 8. If a user's forehead is more prominent than the user's cheek bones, main housing portion 12M may rotate forward in direction 50. This causes light-blocking cover 54 to expand as the distance between main housing portion 12M and support structure 44 of temple housing portions 12T increases to distance D2 (e.g., a distance larger than distance D1 of FIG. 7). In the expanded state of FIG. 8, slack 56 may elongate and may be pulled out of support structure 44. The amount of slack 56 in inner layer 48 may be such that a minimum slack is still maintained in inner layer 48 when main housing portion 12M and support structure 44 of temple housing portions 12T are separated by a maximum distance. The minimum slack may be defined by the point at which the weave of layer 48 (or other fabric of layer 48) begins to open up and light leakage starts to occur.

Because slack 56 is built in to layer 48, light-blocking layer 48 may be formed from stretchable or non-stretchable fabrics or solid sheets of other non-fabric materials (e.g., polymer, elastomer, etc.) without sacrificing opacity or the ability to expand and retract.

To help slack 56 return to its retracted position within support structure 44, an elastic layer may be coupled to inner fabric layer 48 over slack 56. This type of arrangement is illustrated in FIG. 9.

Figure 9:
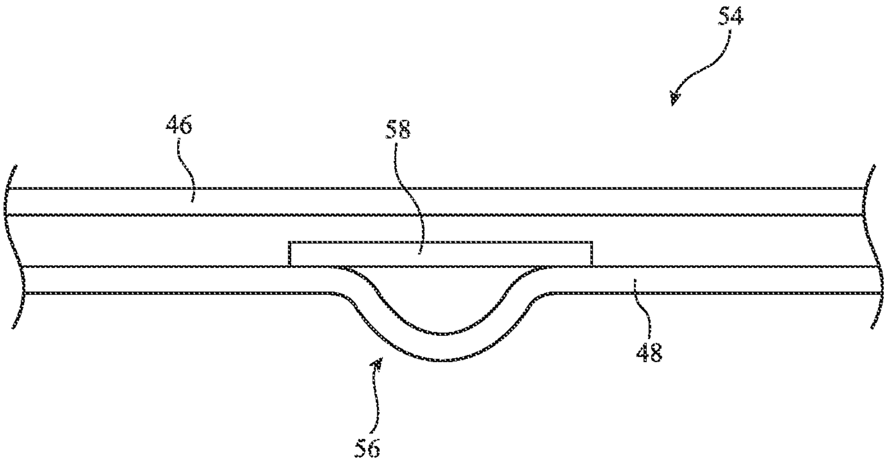
FIG. 9 is a side view of an illustrative light-blocking cover having an elastic layer to help gather slack when the light-blocking cover transitions from an expanded state to a retracted state in accordance with an embodiment.

As shown in FIG. 9, a layer of elastic material such as elastic layer 58 may be coupled to inner fabric layer 48 over slack 56. Elastic layer 58 may be formed from a stretchable fabric (e.g., a fabric formed from elastic strands of material), rubber, polymer, elastomeric silicone or other elastomer, etc. Elastic layer 58 may be more elastic and stretchable than inner layer 48 to help return slack 56 to its original retracted position in support structure 44. When device 10 is mounted on the user's head, elastic layer 58 may expand and lengthen as slack 56 elongates and is pulled out of support structure 44. When device 10 is removed from the user's head, elastic layer 58 may shorten to its original unstretched length, thereby causing slack 56 to gather within support structure 44 (or any other location along layer 48 where slack 56 may be formed).

Figure 10:
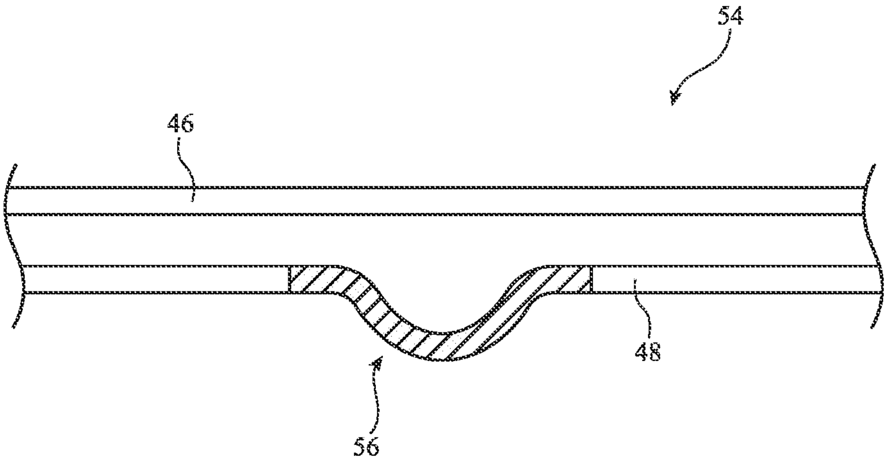
FIG. 10 is a side view of an illustrative light-blocking cover having slack that is heat-set to help return the slack from an expanded state to a retracted state in accordance with an embodiment.

Another illustrative arrangement for ensuring that slack 56 is able to return to its original retracted state is shown in FIG. 10. In the example of FIG. 10, slack 56 is molded or heat-set into the retracted shape. By heat-setting or molding slack 56 into the desired shape (e.g., a U-shape, a horseshoe shape, an S-shape, a figure eight shape, a loop shape, or any other suitable shape), slack 56 may return to its molded or heat-set shape after being stretched.

Figure 11:
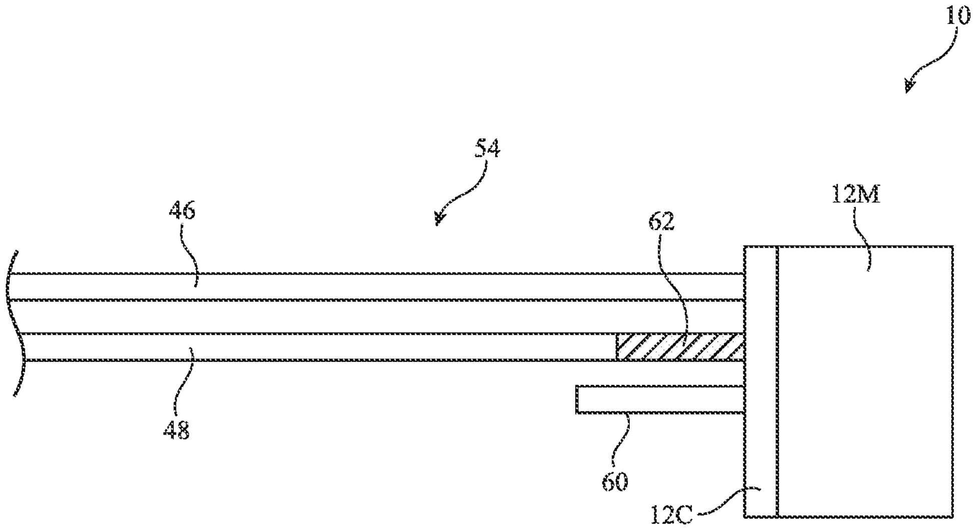
FIG. 11 is a side view of an illustrative head-mounted device having a light-blocking cover with a stretchable region that is overlapped by an internal housing structure in accordance with an embodiment.

FIG. 11 is a side view of head-mounted device 10 in an illustrative arrangement in which inner layer 48 of light-blocking cover 54 has designated stretchable fabric regions that expand and retract. As shown in FIG. 11, inner layer 48 of light-blocking cover 54 may include a stretchable portion such as stretchable portion 62. The remaining portion of inner layer 48 may be non-stretchable or may otherwise be less stretchy than stretchable region 62. For example, inner layer 48 may be formed from a circular knit or flat knit with different amounts of stretch, or the weave in region 62 may be looser than the weave in the remaining portions of layer 48. In other arrangements, region 62 is formed with different materials, a different construction, and/or other different characteristics than the rest of layer 48 (e.g., region 62 may be stretchable fabric while the rest of layer 48 may be non-fabric materials such as a thin sheet of polymer or elastomer). The stretchable portions of layer 48 may be less opaque than the remaining portions of layer 48, so stretchable region 62 may, if desired, be covered by an additional light-blocking layer such as light-blocking structure 60. Light-blocking structure 60 may be an internal housing structure, may form part of a vent in device 10, and/or may be any other suitable opaque structure (e.g., plastic, metal, etc.).

When light-blocking layer 54 expands, stretchable region 62 of inner layer 48 may stretch, while the remaining portions of layer 48 may remain unstretched (or mostly unstretched). Since portion 62 is stretching more than the rest of layer 48, some gaps may form as portion 62 expands. Internal housing structure 60 overlaps stretchable region 62 and prevents light from leaking into the viewing area of device 10.

Figure 12:
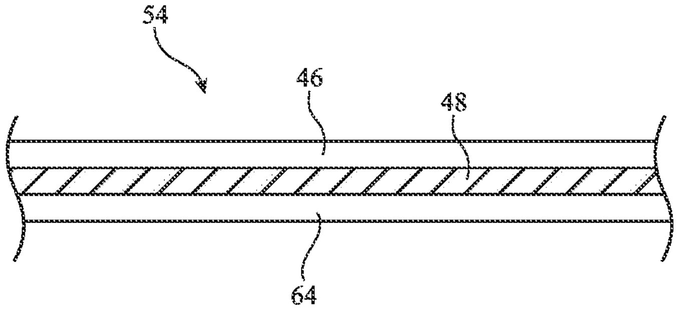
FIG. 12 is a side view of an illustrative light-blocking cover having one or more stretchable layers and light-blocking layers in accordance with an embodiment.

In the example of FIG. 12, light-blocking cover 54 includes inner and outer stretchable layers such as outer stretchable layer 46 and inner stretchable layer 64 (e.g., a stretchable fabric or other stretchable material). Light-blocking layer 48 may be interposed between outer stretchable layer 46 and inner stretchable layer 64. To allow light-blocking layer 48 to stretch without sacrificing opacity, inner layer 48 may be selectively anchored to outer layers 46 and 64. For example, stitching, adhesive, or other attachment structures may be used to fix one or more locations of inner layer 48 to outer layers 6 and 64. This allows the unanchored portions of layer 48 to expand and retract, while the selective anchoring ensures that openings in layer 48 do not align with any openings in layers 46 and 48 in the expanded state.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
- a housing having a main housing portion and a temple housing portion;
- a display in the main housing portion that is configured to provide an image viewable from an eye box; and
- a light-blocking cover that extends between the main housing portion and the temple housing portion and that is configured to block outside light from reaching the eye box, wherein the light-blocking cover moves between an expanded state and a retracted state as the main housing portion moves relative to the temple housing portion, and wherein the light-blocking cover has slack in both the expanded and retracted states so that an opacity of the light-blocking cover is not reduced in the expanded state.

2. The head-mounted device defined in claim 1 wherein the light-blocking cover comprises an outer layer and an inner layer.

3. The head-mounted device defined in claim 2 wherein the inner layer comprises a light-blocking inner layer.

4. The head-mounted device defined in claim 3 wherein the slack is located in the light-blocking inner layer.

5. The head-mounted device defined in claim 4 wherein the outer layer comprises an outer fabric layer and the inner layer comprises an inner fabric layer.

6. The head-mounted device defined in claim 5 wherein the outer fabric layer is more stretchable than the inner fabric layer.

7. The head-mounted device defined in claim 2 wherein the outer layer comprises fabric and the inner layer comprises an elastomeric material.

8. The head-mounted device defined in claim 1 wherein the slack is configured to expand and retract as the main housing portion moves relative to the temple housing portion.

9. The head-mounted device defined in claim 8 wherein the slack is configured to retract into the temple housing portion.

10. The head-mounted device defined in claim 8 wherein the slack is heat-set so that the slack returns to a retracted position after being expanded.

11. The head-mounted device defined in claim 8 wherein the slack is molded so that the slack returns to a retracted position after being expanded.

12. The head-mounted device defined in claim 8 further comprising a layer of elastic material coupled to the light-blocking cover over the slack, wherein the layer of elastic is configured to return the slack to a retracted position after being expanded.

13. A head-mounted device, comprising:
- a housing having a main housing portion and a temple housing portion;
- a display in the main housing portion that is configured to provide an image viewable from an eye box; and
- a light-blocking cover that extends between the main housing portion and the temple housing portion and that is configured to block outside light from reaching the eye box, wherein the light-blocking cover has a stretchable fabric portion and a light-blocking fabric portion.

14. The head-mounted device defined in claim 13 wherein the stretchable fabric portion comprises inner and outer stretchable fabric layers and the light-blocking fabric portion comprises a light-blocking fabric layer interposed between the inner and outer stretchable fabric layers.

15. The head-mounted device defined in claim 14 wherein the light-blocking fabric layer is selectively anchored to the inner and outer stretchable fabric layers.

16. The head-mounted device defined in claim 15 wherein stretchable fabric portion and the light-blocking fabric portion are formed in a single layer and wherein the stretchable fabric portion is more stretchable than the light-blocking fabric portion.

17. The head-mounted device defined in claim 16 further comprising an internal housing structure that overlaps the stretchable fabric portion and is configured to block any of the outside light that passes through the stretchable fabric portion from reaching the eye box.

18. A head-mounted device, comprising:

a main housing portion;

a display in the main housing portion that is configured to provide an image viewable from an eye box; and a light-blocking cover that extends at least partially around a periphery of the main housing portion and that is configured to block outside light from reaching the eye box, wherein the light-blocking cover comprises a stretchable fabric outer layer and a light-blocking inner fabric layer having slack that allows the light-blocking cover to expand and retract without reducing an opacity of the light-blocking cover.

19. The head-mounted device defined in claim 18 further comprising a temple housing portion, wherein the slack is configured to retract into the temple housing portion.

20. The head-mounted device defined in claim 19 wherein the slack is configured to expand and elongate out of the temple housing portion when the main housing portion moves away from the temple housing portion.

* * * * *